(12) United States Patent
Osvald et al.

(10) Patent No.: US 10,888,790 B2
(45) Date of Patent: *Jan. 12, 2021

(54) LOW-FRICTION RESPONSE IN A SOCIAL GAME

(71) Applicant: Zynga Inc., San Francisco, CA (US)

(72) Inventors: John Osvald, Albany, CA (US); Michael Waite, Alamo, CA (US); Kyle Saugier, South San Francisco, CA (US); Lauren Duncan, Fairview, TX (US); Erik Nilsson, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/147,875

(22) Filed: Oct. 1, 2018

(65) Prior Publication Data

US 2019/0038980 A1 Feb. 7, 2019

Related U.S. Application Data

(63) Continuation of application No. 13/196,846, filed on Aug. 2, 2011, now Pat. No. 10,086,292.

(51) Int. Cl.
| | |
|---|---|
| *A63F 13/795* | (2014.01) |
| *A63F 13/655* | (2014.01) |
| *A63F 13/87* | (2014.01) |
| *A63F 13/847* | (2014.01) |
| *A63F 13/35* | (2014.01) |
| *A63F 13/533* | (2014.01) |

(52) U.S. Cl.
CPC .......... *A63F 13/795* (2014.09); *A63F 13/655* (2014.09); *A63F 2300/556* (2013.01); *A63F 2300/5566* (2013.01)

(58) Field of Classification Search
USPC .......................................... 463/42
See application file for complete search history.

(56) References Cited

U.S. PATENT DOCUMENTS

| | | | | |
|---|---|---|---|---|
| 2011/0237335 | A1* | 9/2011 | Holloway | ............. A63F 13/795 463/42 |
| 2011/0307807 | A1* | 12/2011 | Norby | .................. A63F 13/795 715/758 |

* cited by examiner

*Primary Examiner* — Robert T Clarke, Jr.
(74) *Attorney, Agent, or Firm* — Penilla IP, APC

(57) ABSTRACT

A method for performing a social project in a video game is provided. A session of the video game for a primary user is initiated, and a social project is initiated within the session of the video game. One or more secondary users are determined from a social graph of the primary user. A message requesting help to complete the social project is sent to the one or more secondary users, the message including a low-friction response mechanism. Upon activation of the low-friction response mechanism of the request, a response is received indicating an intent to help complete the social project from a responsive secondary user. Upon receiving the response, automated animation of an avatar of the responsive secondary user is triggered within the primary user's session of the video game so as to collaborate on the social project.

18 Claims, 11 Drawing Sheets

LOW-FRICTION RESPONSE IN A SOCIAL GAME

CLAIM OF PRIORITY

This application claims priority as a continuation of U.S. patent application Ser. No. 13/196,846, entitled "LOW-FRICTION RESPONSE IN A SOCIAL GAME," the disclosure of which is herein incorporated by reference in its entirety.

RELATED APPLICATIONS

This application is related to U.S. patent application Ser. No. 13/079,775, entitled "APPARATUS, METHOD AND SYSTEM FOR CREW MECHANICS IN MULTIPLAYER GAMES," the disclosure of which is herein incorporated by reference in its entirety.

BACKGROUND

1. Field of the Invention

The present invention relates to methods and systems for enabling a low-friction response in a social gaming context.

2. Description of the Related Art

With the continuing growth of the Internet, both social networking and social gaming have rapidly grown. Social games provide opportunities and mechanisms for users to collaboratively achieve the various goals of such games.

It is in this context that embodiments of the invention arise.

SUMMARY

Embodiments of the present invention provide methods and systems for enabling low-friction response in a social gaming context. It should be appreciated that the present invention can be implemented in numerous ways, such as a process, an apparatus, a system, a device or a method on a computer readable medium. Several inventive embodiments of the present invention are described below.

In one embodiment, a method for performing a social project in a video game is provided. According to the method, a session of the video game for a primary user is initiated, and a social project is initiated within the session of the video game. One or more secondary users are determined from a social graph of the primary user. A message requesting help to complete the social project is sent to the one or more secondary users, the message including a low-friction response mechanism. Upon activation of the low-friction response mechanism of the request, a response is received indicating an intent to help complete the social project from a responsive secondary user. Upon receiving the response, automated retrieval and animation of an avatar of the responsive secondary user is triggered within the primary user's session of the video game so as to collaborate on the social project.

In one embodiment, the activation of the low-friction response mechanism terminates further participation by the responsive secondary user. And the automated retrieval and animation of the avatar does not require the responsive secondary user to control the avatar.

In one embodiment, determining one or more secondary users includes searching the social graph of the primary user for users having accounts for the video game, presenting a portion of the users having accounts in the primary user's session, and receiving a selection of users from among the presented portion.

In one embodiment, a speed of performance of the social project increases in response to receiving the response from the responsive secondary user.

In one embodiment, upon receiving the response, the account of the responsive secondary user is credited.

In one embodiment, retrieving the avatar of the responsive secondary user includes retrieving a profile picture of the responsive secondary user.

In another embodiment, a computer program product comprising program instructions embodied on a computer readable medium is provided, the program instructions for performing a social project in a video game. The computer program product includes program instructions for initiating a session of the video game for a primary user, program instructions for initiating a social project within the session of the video game, and program instructions for determining one or more secondary users from a social graph of the primary user. The computer program product further includes program instructions for sending a message requesting help to complete the social project to the one or more secondary users, the message including a low-friction response mechanism and program instructions for receiving, upon activation of the low-friction response mechanism of the request, a response indicating an intent to help complete the social project from a responsive secondary user. Additionally, the computer program product includes program instructions for, upon receiving the response, triggering automated retrieval and animation of an avatar of the responsive secondary user within the primary user's session of the video game so as to collaborate on the social project.

In another embodiment, a video game server for performing a social project in a video game is provided. The video game server includes a session manager for initiating a session of the video game for a primary user, the session including a social project. A request generator is provided for determining one or more secondary users from a social graph of the primary user, and sending a message requesting help to complete the social project to the one or more secondary users, the message including a low-friction response mechanism, activation of the low-friction response mechanism sending a response indicating an intent to help complete the social project from a responsive secondary user. And a collaboration module is configured to, upon receiving the response, perform automated retrieval and animation of an avatar of the responsive secondary user within the primary user's session of the video game so as to collaborate on the social project.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and apparatus for facilitating low-friction responses to requests in a social game. Accordingly, methods and apparatus in accordance with embodiments of the invention will now be described.

It will be obvious, however, to one skilled in the art, that the present invention may be practiced without some or all of these specific details. In other instances, well known process operations have not been described in detail in order not to unnecessarily obscure the present invention.

Figure 1:
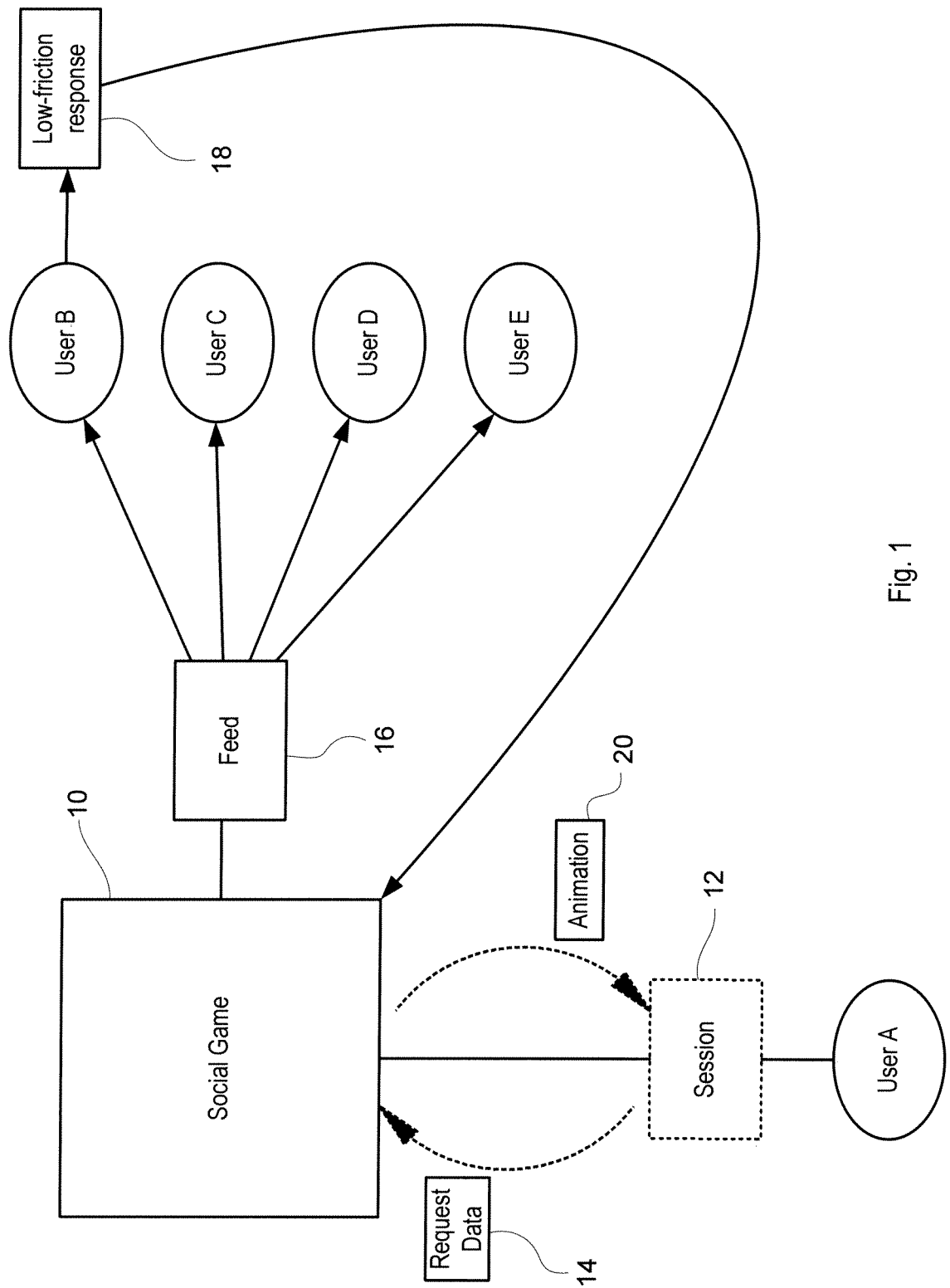
FIG. 1 illustrates an overall mechanism for providing a low friction response in a social gaming context, in accordance with an embodiment of the invention.

FIG. 1 illustrates an overall mechanism for providing a low friction response in a social gaming context, in accordance with an embodiment of the invention. The social game 10 is an online multiplayer game providing opportunities for users to collaboratively accomplish tasks or achieve various goals within the game. As shown, a user A is currently engaged in a session 12 of the social game 10. During the course of playing the social game 10, the user A may encounter a task which requires or is otherwise more easily accomplished through collaboration with other users. In such a scenario, the user A sends a request for help to accomplish the task to selected friends. Accordingly, the user A generates request data 14 which defines the nature of the request for help, such as the specific task, and to whom the request will be sent.

Based on the request data 14, the social game 10 generates a feed 16 containing messages for each of users B, C, D, and E, requesting their help to accomplish the task faced by user A in user A's session. The users B, C, D, and E have been selected by the user A from user A's social graph. Each of the messages includes a mechanism for providing a low friction response to user A's request for help.

In a typical scenario, when responding to a fellow user's request for help, one is required to log into the social game, access the request for help, and indicate their willingness to help. These requirements constitute sources of "friction" as they are cumbersome to those who simply wish to help a friend who has requested it, but have no intention to engage in a longer session of the social game than is necessary to provide the help. Thus, a low friction response mechanism will enable such users to more readily provide help to those requesting it in a streamlined fashion.

In the illustrated embodiment, the user B activates a low friction response 18, indicating a positive response to the request for help. The user B is able to activate the low friction response 18 directly from the received message from user A. The low friction response 18 is communicated to the social game 10, triggering the generation of an animation of user B's avatar in user A's session 12 of the social game 10. The animation shows user B's avatar helping user A in accomplishing the task, thus providing user A with the impression that user B is actively participating in the game, even though user B actually is not. In this manner, user B is able to provide help to user A, and so enable user A to advance within the social game 10, without having to log in to a session of the game itself or perform other activities within the game.

In some embodiments, the user B may gain a reward of some kind for positively responding to user A's request for help. This may be in the form of points, currency, energy, skills, or some other form of reward that is of value within the context of the social game 10. Thus, in addition to automatic animation of user B's avatar within user A's session, user B's account is also automatically credited with any reward resulting from the positive response.

Figure 2:
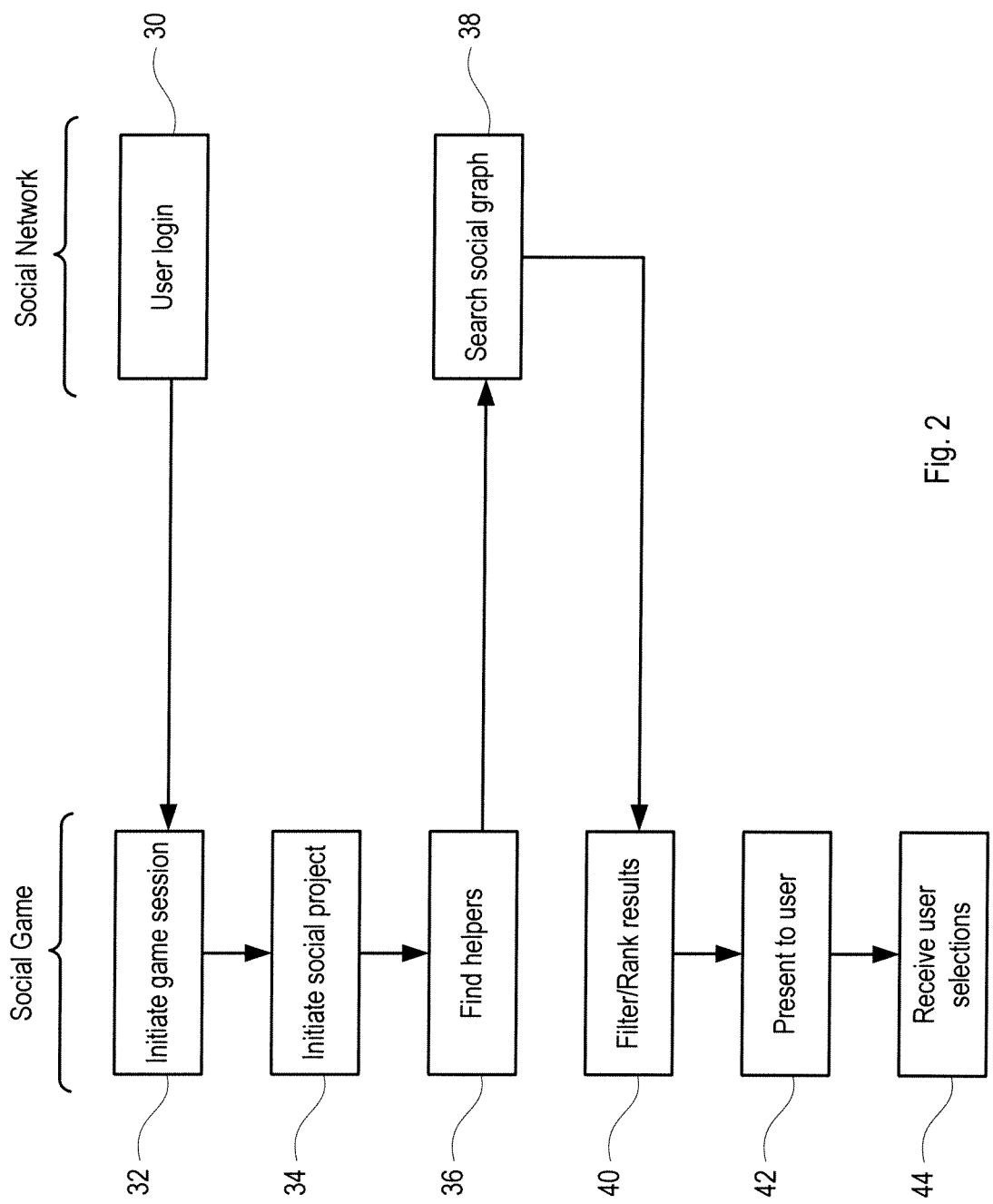
FIG. 2 illustrates a process for selecting users to receive a request for help in a social game, in accordance with an embodiment of the invention.

FIG. 2 illustrates a process for selecting users to receive a request for help in a social game, in accordance with an embodiment of the invention. At method operation 30 a user logs in to a social network. At method operation 32, the user initiates a game session of a social game from the social network. At method operation 34, the user initiates a social project during the course of gameplay. The social project can require collaboration or help from other users, or may be configured to promote collaboration by, for example, being completed faster, more efficiently, or with less resource consumption from the user's account when additional users collaborate to help complete the project.

At method operation 36, the social game seeks out possible helpers for the user. In one embodiment, this is performed by accessing an API of the social network to search the user's social graph as defined in the social network, as indicated at method operation 38. It will be appreciated that in various embodiments, the search of the user's social graph can be performed according to various parameters. For example, in one embodiment, the search may be configured to retrieve only those users which also have accounts for playing the social game. In one embodiment, the search may be configured to retrieve only those users who are currently logged in to the social network. In one embodiment, the search may also be configured to retrieve only those users with a certain progress level, status, skill level, energy level, currency amount, specific acquired item, or other parameter within the social game. It will be apparent to those skilled in the art that in various embodiments, the search may be configured to retrieve only selected users from the primary user's social graph according to any of various parameters pertaining to the social game and the specific social project to be accomplished.

Additionally, the search can be configured to retrieve any of various types of information about the users from the social network or from their respective social game accounts. Such information might include any of various social network account parameters, such as age, gender, geographic location, number of common friends, etc. as well as any of various types of social game account parameters, such as progress, skill, energy, or currency levels, frequency or amount of gameplay, recent activity, amount of prior participation in helping other users, etc. It will be apparent that in various embodiments, the search can be tailored to retrieve an expansive variety of information from either or both of the social network and the social game.

At method operation 40, the results of searching the user's social graph for possible helpers are filtered or sorted so as to provide a ranked order of possible helpers. In various embodiments, the specific filtering or sorting may be according to any one of or a combination of the aforementioned social network account parameters or social game account parameters. For example, in one embodiment, the results are sorted such that those users who are currently accessing the social game are ranked for presentation first, followed by those who are logged in to the social network only, followed by those who are offline. In some embodiments, one or more of the subgroups can be further sorted according to various parameters. In still other embodiments, the results can be sorted in various ways, such as prioritizing users according to progress, skill, energy, currency, gameplay time, historical response time to requests for help, etc. It will be appreciated that the results can be sorted and ranked according any of various parameters relevant to the social game and the social project. Generically speaking, it is desirable to rank the users utilizing a formulation that is predictive of their likeliness and timeliness of responding in a positive manner to the user's request for help. In this manner, the user will be able to efficiently select users from his/her social graph to send requests for help in completing the social project, and receive help in a timely manner At method operation 42, the possible helpers are presented to the user according to their ranked order. And at method operation 44, the social game receives the user's selections from amongst the possible helpers.

Figure 3:
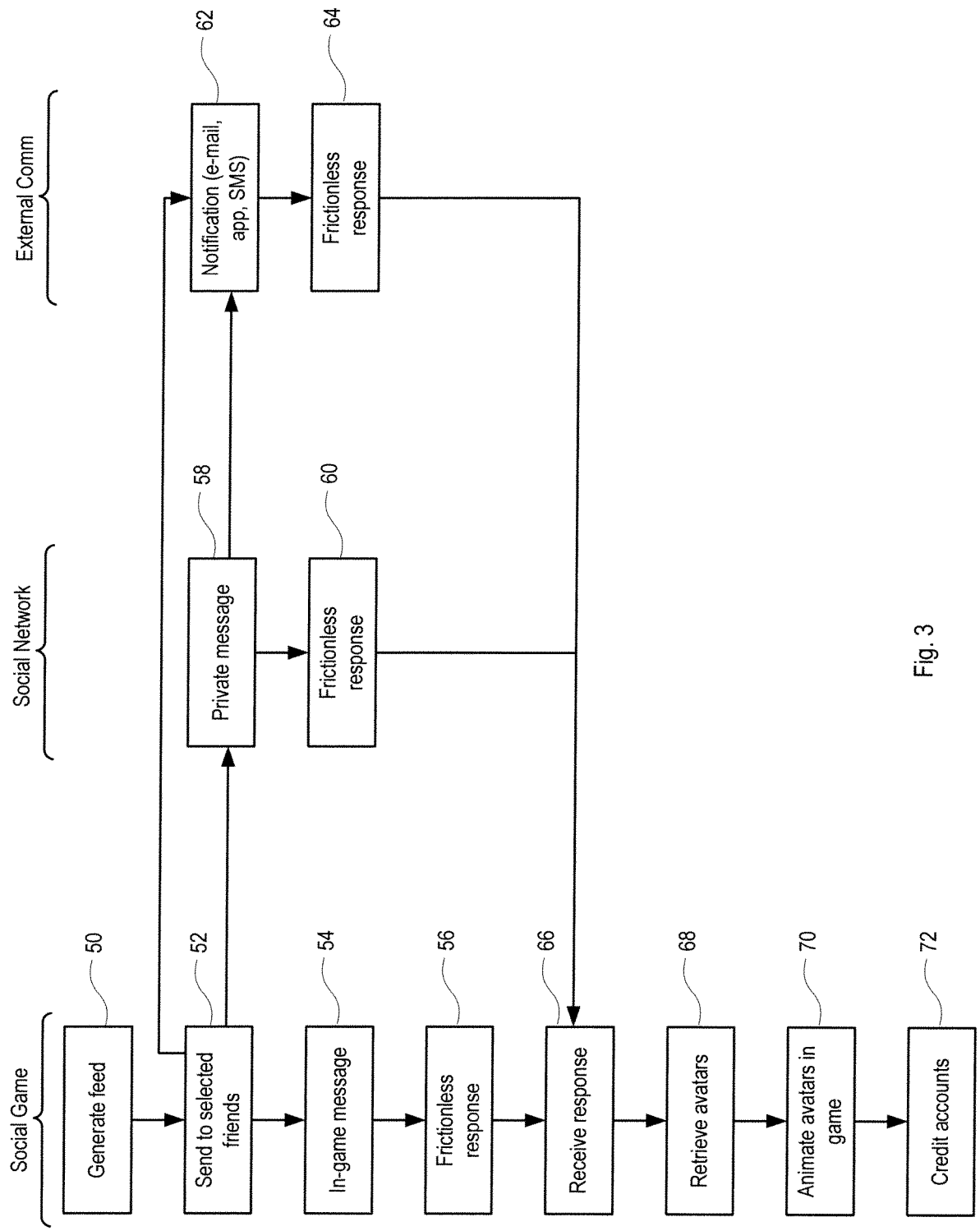
FIG. 3 illustrates a flow diagram for providing a frictionless response to a request for help, in accordance with an embodiment of the invention.

FIG. 3 illustrates a flow diagram for providing a frictionless response to a request for help, in accordance with an embodiment of the invention. At method operation 50, a request for help to complete a social project or task within the social game is generated. The request for help includes a link or mechanism which facilitates a frictionless positive response to the request from the recipient of the request. At operation 52, the request is sent to selected friends from the user's social graph.

The particular nature of the message sent may vary depending upon the current status of the particular friend. For example, if the friend is currently logged in to the social game, then at in-game message 54 is sent. Whereas if the friend is currently logged in to the social network, but not logged in to the game, then a private message 58 via the social network may be sent to the friend. Further, if the friend is not logged in to the social network, but has authorized external communications via the social network, then the friend may receive a notification 62 regarding the private message via such designated external communication mechanisms, such as via e-mail or text message. In another embodiment, if the friend has authorized the social game to communicate using an external communication mechanism, then the social game may directly send the request to the friend via a designated external communication mechanism.

The request includes a mechanism for activating a frictionless response 56, 60, or 64. For example, the request the may include a link, reference or other communication trigger which activates the frictionless response. Thus, the friend who wishes to indicate a positive response to the request for help is only required to click on a graphic or word having the embedded link or communication trigger. No additional steps are required on the part of the friend in order to help the user who sent them the request for help.

At reference numeral 66, the social game receives the positive response, which in turn triggers retrieval of the friend's avatar at reference numeral 68. At reference numeral 70, the friend's avatar is animated within the user's session of the social game so as to show the friend's avatar providing help in completing the social project. In this manner, the user experiences a scene within the session of the social game wherein it appears that the user's friend is actively participating in helping complete the social project, when in fact the user's friend is not actively participating. Nonetheless, the friend's avatar is being automatically animated to appear as such. At reference numeral 72, the account of the user is credited with completion of the social project. And in some embodiments, the account of the friend who provided the help is also credited with a reward for helping.

Figure 4:
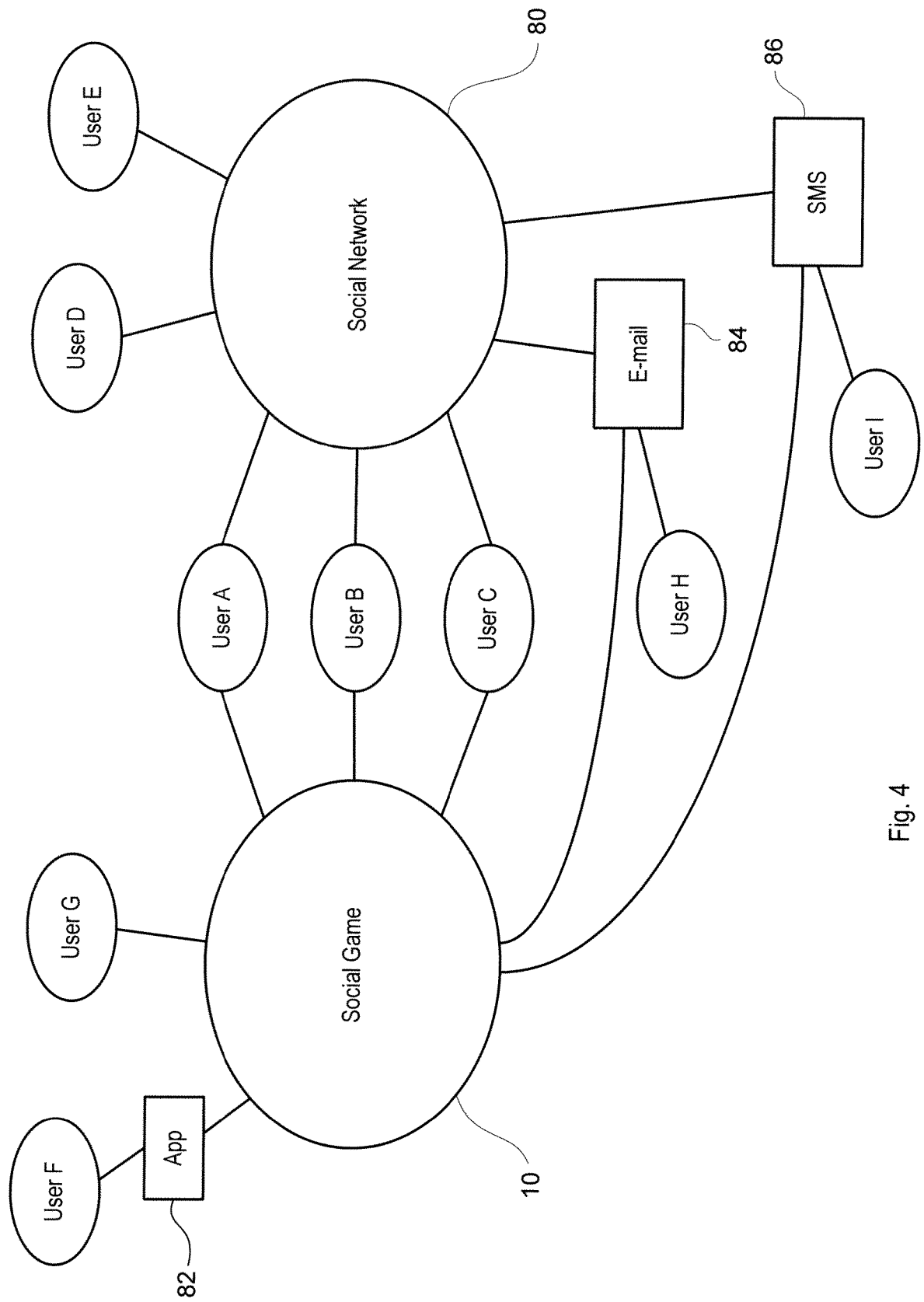
FIG. 4 illustrates a plurality of users interacting with a social game in various ways, in accordance with embodiments of the invention.

FIG. 4 illustrates a plurality of users interacting with a social game in various ways, in accordance with embodiments of the invention. As shown, users A, B, and C are accessing both the social game 10 and the social network 80. The social game 10 can be configured to be instantiated from the social network 80. Users D and E are accessing the social network 80, but not the social game 10. Users F and G are accessing the social game 10 independently of the social network 80. For example, the user F accesses the social game 10 via an application on a mobile device such as a cellular phone or tablet computer. User H receives e-mail 84 which can be generated by the social game itself 10, or by the social network 80 in response to the social game 10 sending a message to user H's social network account. Similarly, user I receives a text message 86 which can be generated by the social game itself 10, or by the social network 80 in response to the social game 10 sending a message to user H's social network account.

Figure 5:
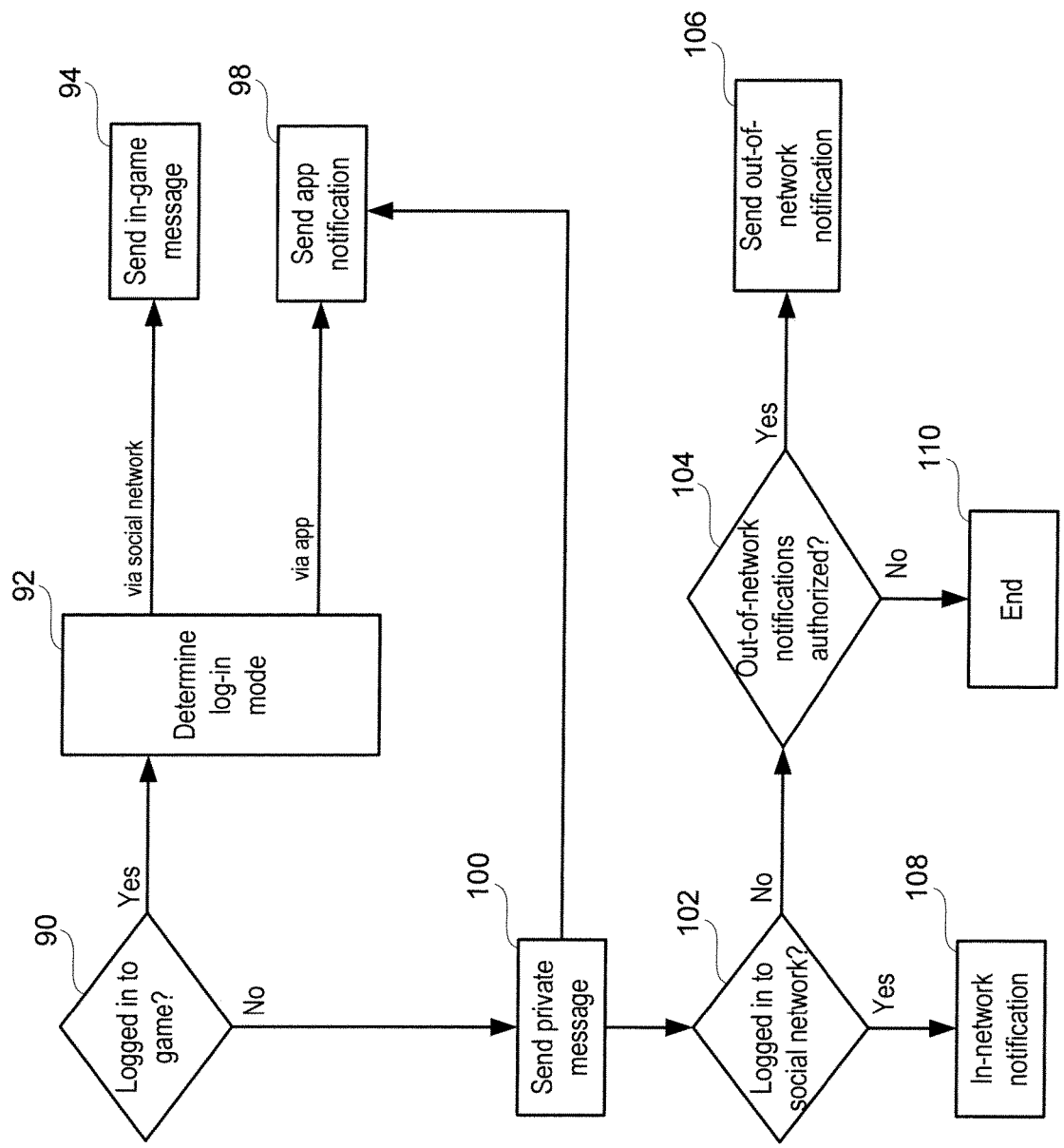
FIG. 5 is a flow diagram illustrating selection of a communication method for sending a request for help in completing a social project in a social game, in accordance with an embodiment of the invention.

FIG. 5 is a flow diagram illustrating selection of a communication mechanism for sending a request for help in completing a social project in a social game, in accordance with an embodiment of the invention. At operation 90, it is determined whether a particular user is logged into the social game. If so, then at operation 92, the user's log-in mode is determined. For example, if it is determined that the user is logged in via the social network, then the request message is sent as an in-game message in the user's session of the social game at operation 94. Whereas, if it is determined that the user is logged into the social game via a standalone application, such as an app on a mobile device, then the message is sent as a notification in the application, as indicated by operation 98.

If it is determined that the user is not logged in to the game, then a private message is sent at operation 100. In one embodiment, the private message is sent via an API of the social network, and appears as a message in the user's social network account. In another embodiment, the private message can be a message sent to the user's social game account. In one embodiment, the user can receive a notification at an app on a mobile device informing him/her about the receipt of the message.

At operation 102, it is determined whether the user is logged in to the social network. If so, then a notification is sent via the social network to the user, indicating that a private message has been received. If not, then at operation 104 it is determined whether out-of-network notifications have been authorized for the user's social network account. If so, then at operation 106, an out-of-network notification, such as an e-mail or text message or other external communication is sent to the user. If not, then the process ends at operation 110.

Figure 6:
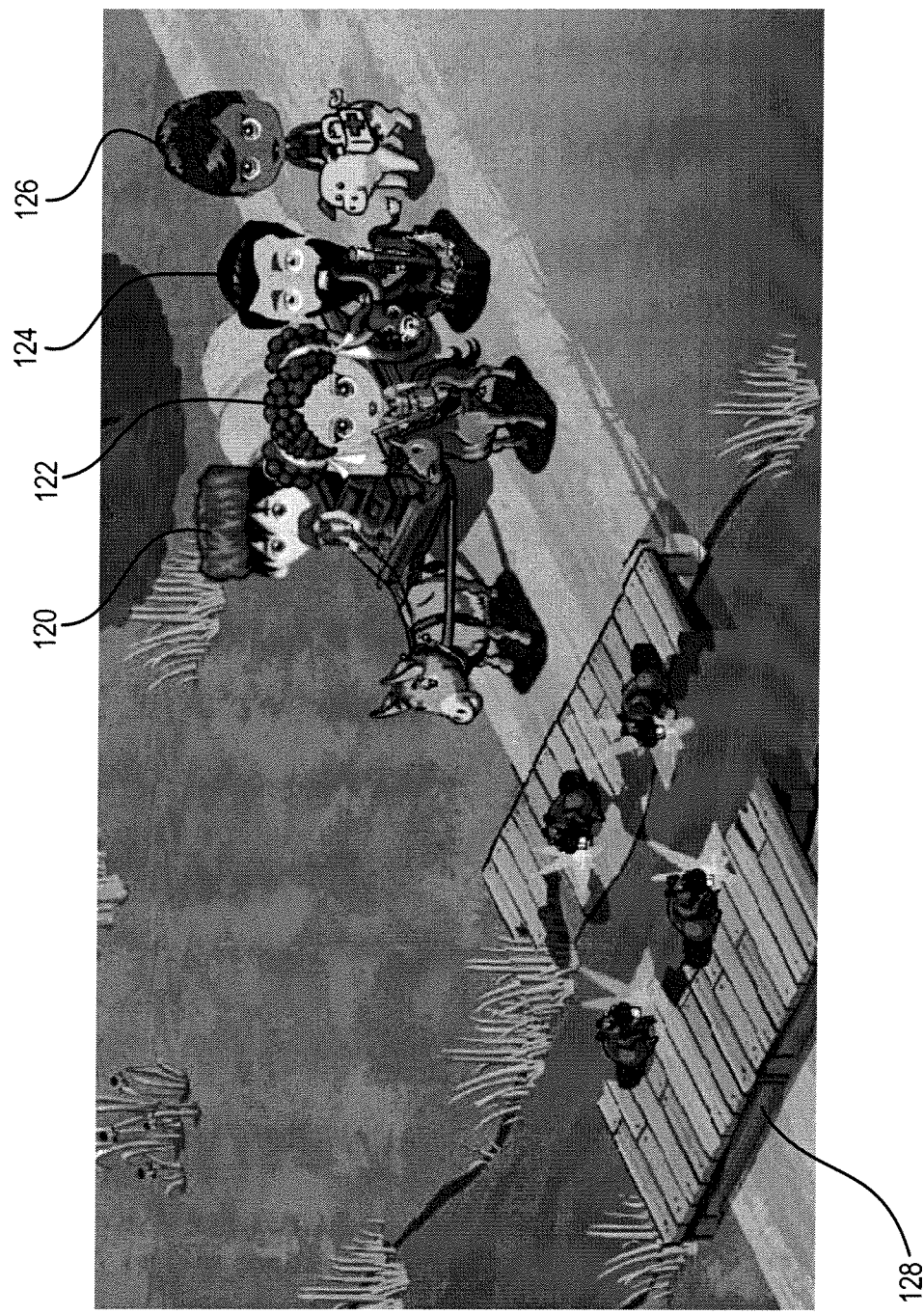
FIG. 6 illustrates a session of a social game, in accordance with an embodiment of the invention.
Figure 7:
FIG. 7 illustrates a session of a social game, in accordance with an embodiment of the invention.

FIG. 6 illustrates a session of a social game, in accordance with an embodiment of the invention. As shown, a crew leader 120, and crew members 122, 124, and 126 are tasked with repairing a bridge 128 which has been damaged by beavers. The crew leader 120 can send a request for help to additional players in order to speed the process of repairing the bridge. As shown at FIG. 7, additional users having avatars 130 and 132 have responded to the request for help, and their avatars are animated in the session of the social game. The additional users are able to respond positively in a low-friction manner, without being required to log in to their own accounts of the social game. In one embodiment, a picture 134 of the user whose avatar 130 is being animated is shown above the user's avatar 130. The picture can be imported from the user's social network account. The user's picture can also be customized for responses or can be presented with multimedia. The multimedia can include animating the user's picture, playing a recorded video, and presenting sounds of the user's voice while the avatar of the user is presented, doing its predefined animation to illustrate the help in response to the request for help. An energy meter 136 indicates the crew's amount of energy. In one embodiment, completion of the task requires less energy when additional users respond positively to the request for help.

Figure 8:
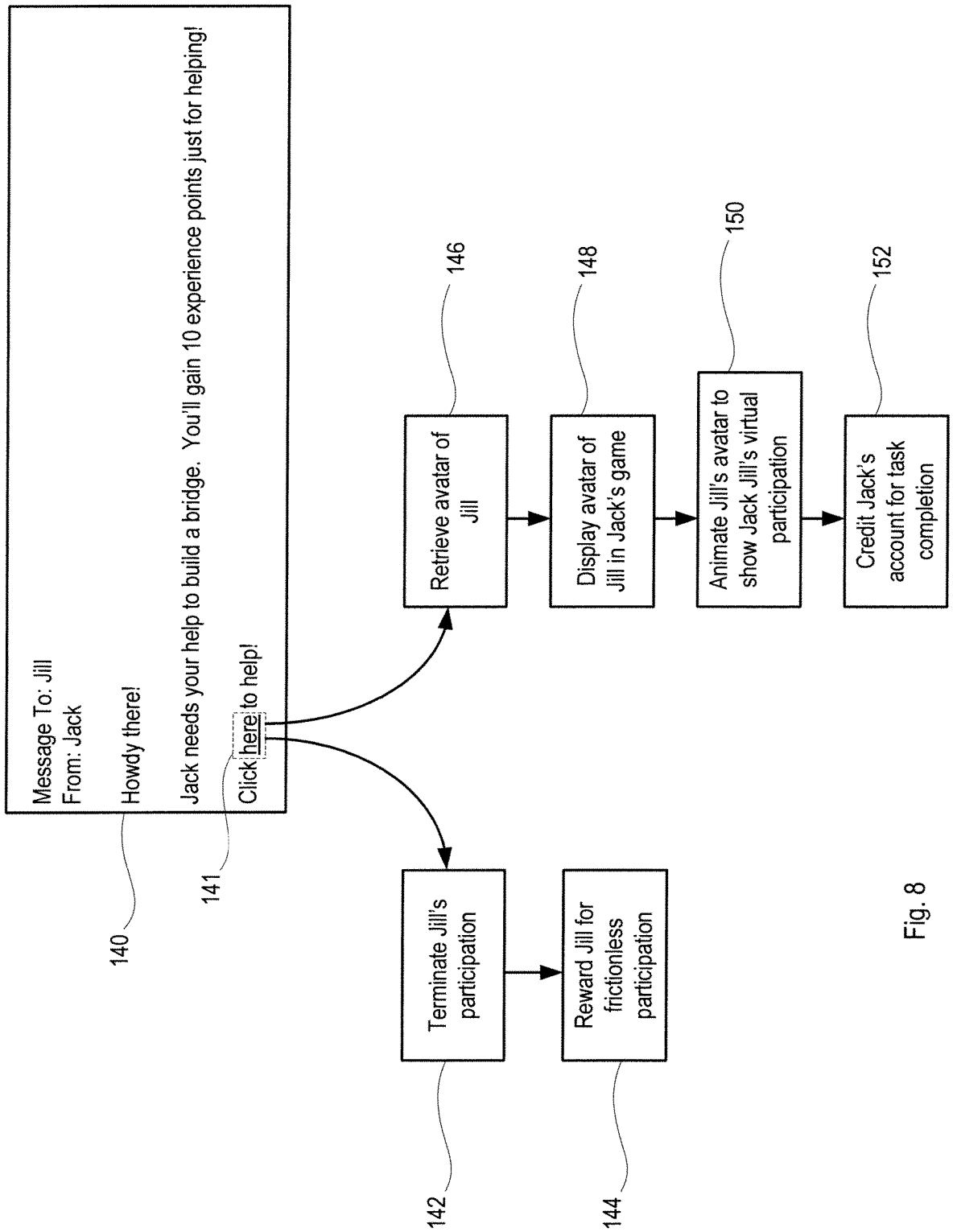
FIG. 8 illustrates a request for help to complete a social project, in accordance with an embodiment of the invention.

FIG. 8 illustrates a request for help to complete a social project, in accordance with an embodiment of the invention. The request 140 is sent from a sender to a receiver, and includes a link 141, which when activated triggers a frictionless response mechanism. At operation 142, the receiver's actual participation is terminated upon activating the link. And at operation 144, the receiver's social game account is credited with a reward for helping the sender to complete the social project. At operation 146, the avatar of the receiver is retrieved, and at operation 148, the avatar is displayed in the sender's session of the social game. At operation 150, the receiver's avatar is automatically animated so as to show participation in helping the sender to complete the social project. At operation 152, the sender's account is credited for completion of the social project.

Figure 9:
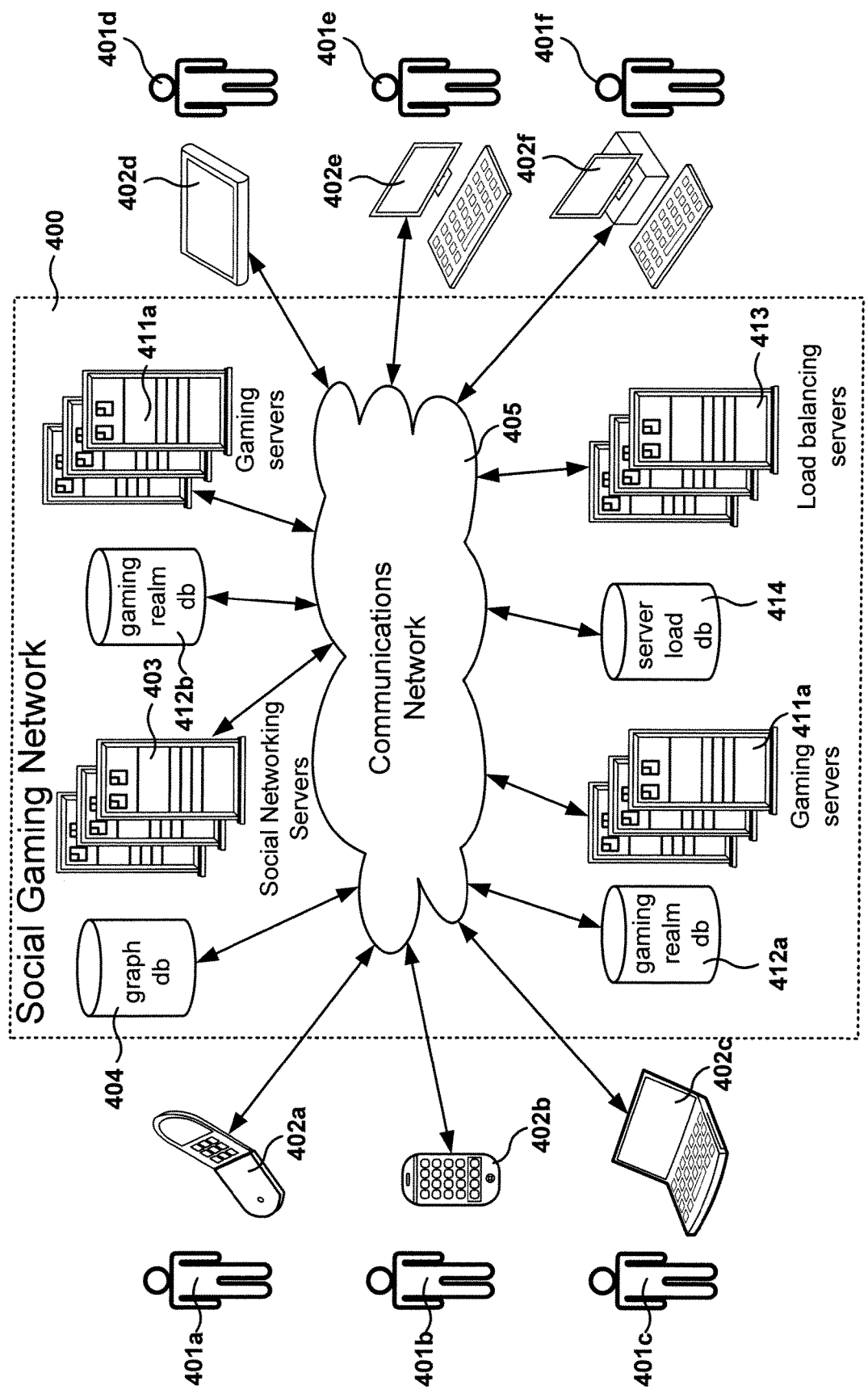
FIG. 9 shows a block diagram illustrating a social gaming network architecture, in accordance with an embodiment of the invention.

FIG. 9 shows a block diagram illustrating a social gaming network architecture, according to one embodiment. In some implementations, a plurality of players (e.g., 401a-401f) may be utilizing a social gaming network 400. Each player interacts with the social gaming network via one or more client devices (e.g., client devices 402a-402f). The clients may communicate with each other and with other entities affiliated with the gaming platform via communications network 405. Further, the players may be utilizing a social networking service provided by a social networking server (e.g., social networking servers 403) to interact with each other.

When a player provides an input into the player's client device, the client device may in response send a message via the communications network to the social networking server. The social networking server may update the player profile, save the message to a database, send messages to other players, etc. The social gaming network may include a social graph database 404, which stores player relationships, social player profiles, player messages, and player social data.

The gaming servers host one or more gaming applications, and perform the computations necessary to provide the gaming features to the players and clients. One or more gaming realm databases (e.g., 412a-412b) store data related to the gaming services, such as the gaming applications and modules, virtual gaming environment ("realm") data, player gaming session data, player scores, player virtual gaming profiles, game stage levels, etc. The gaming servers may utilize the data from the gaming realm databases to perform the computations related to providing gaming services for the players. In some implementations, a server load database 414b stores gaming server load statistics, such as computational load, server responses times, etc. The social gaming network may include a load balancing server 413.

Figure 10:
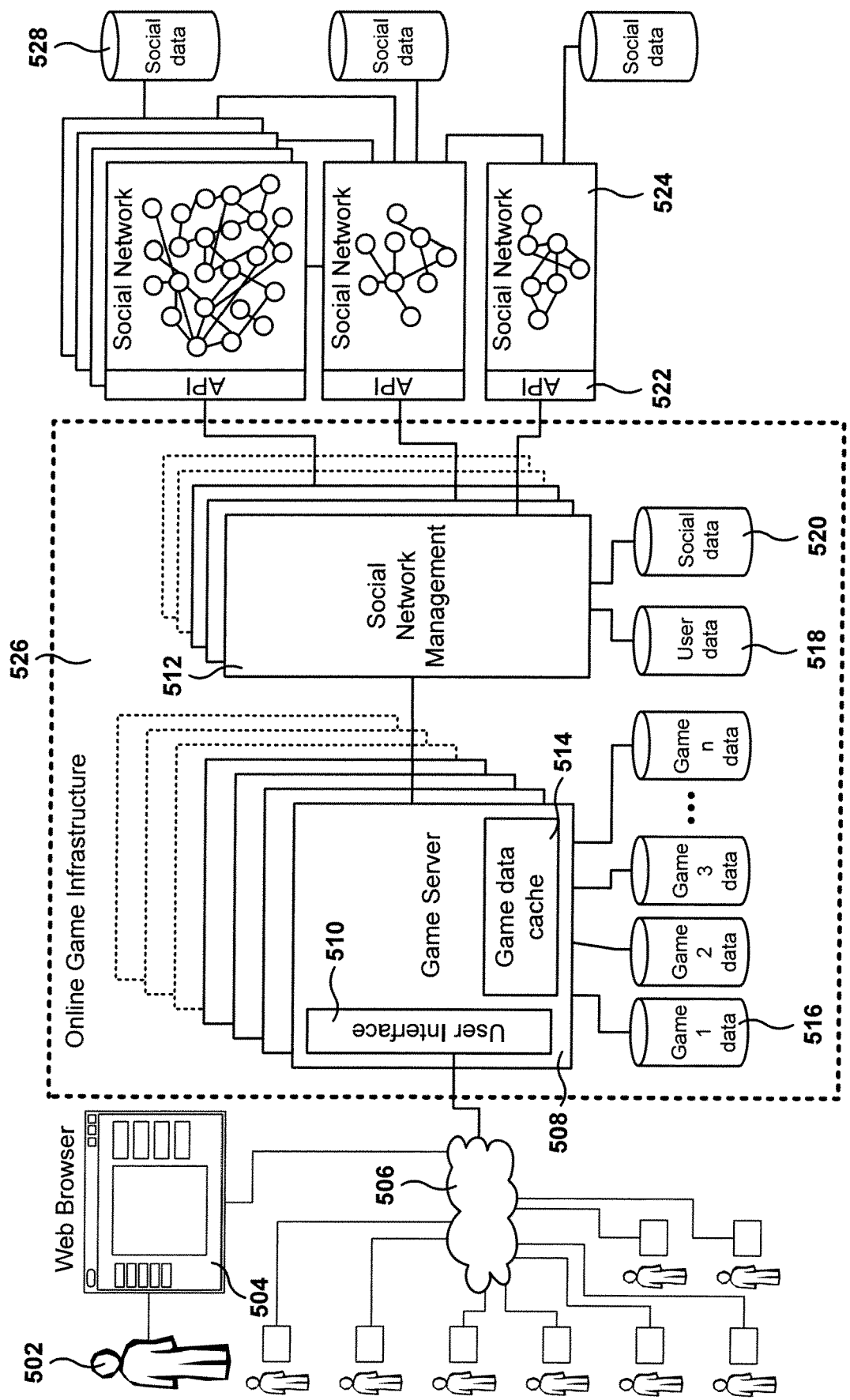
FIG. 10 illustrates an implementation of an online game infrastructure, in accordance with an embodiment of the invention.

FIG. 10 illustrates an implementation of an online game infrastructure, according to one embodiment. The online game infrastructure 526 includes one or more game servers 508, web servers (not shown), one or more social network management servers 512, and databases to store game related information. In one embodiment, game server 508 provides a user interface 510 for players 502 to play the online game. In one embodiment, game server 508 includes a Web server for players 502 to access the game via web browser 504, but the Web server may also be hosted in a server different from game server 508. Network 506 interconnects players 502 with the one or more game servers 508.

Each game server 508 has access to one or more game databases 516 for keeping game data. In addition, a single database can store game data for one or more online games. Each game server 508 may also includes one or more levels of caching. Game data cache 514 is a game data cache for the game data stored in game databases 516. For increased performance, caching may be performed in several levels of caching.

The number of game servers 508 changes over time, as the gaming platform is an extensible platform that changes the number of game servers according to the load on the gaming infrastructure. As a result, the number of game servers will be higher during peak playing times, and the number of game servers will be lower during off-peak hours.

One or more social network management servers 512 provide support for the social features incorporated into the online games. The social network management servers 512 access social data 528 from one or more social networks 524 via Application Programming Interfaces (API) 522 made available by the social network providers. Each social network 524 includes social data 528, and this social data 528, or a fraction of the social data, is made available via API 522. As in the case of the game servers, the number of social network management servers 512 that are active at a point in time changes according to the load on the infrastructure. As the demand for social data increases, the number of social network management servers 512 increases. Social network management servers 512 cache user data in database 518, and social data in database 520. The social data might include the social networks where a player is present, the social relationships for the player, the frequency of interaction of the player with the social network and with other players, etc. Additionally, the user data kept in database 518 may include the player's name, demographics, e-mail, games played, frequency of access to the game infrastructure, etc.

It is noted that the embodiment illustrated in FIG. 10 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 10 should therefore not be interpreted to be exclusive or limiting, but rather exemplary or illustrative.

CMMG Controller

Figure 11:
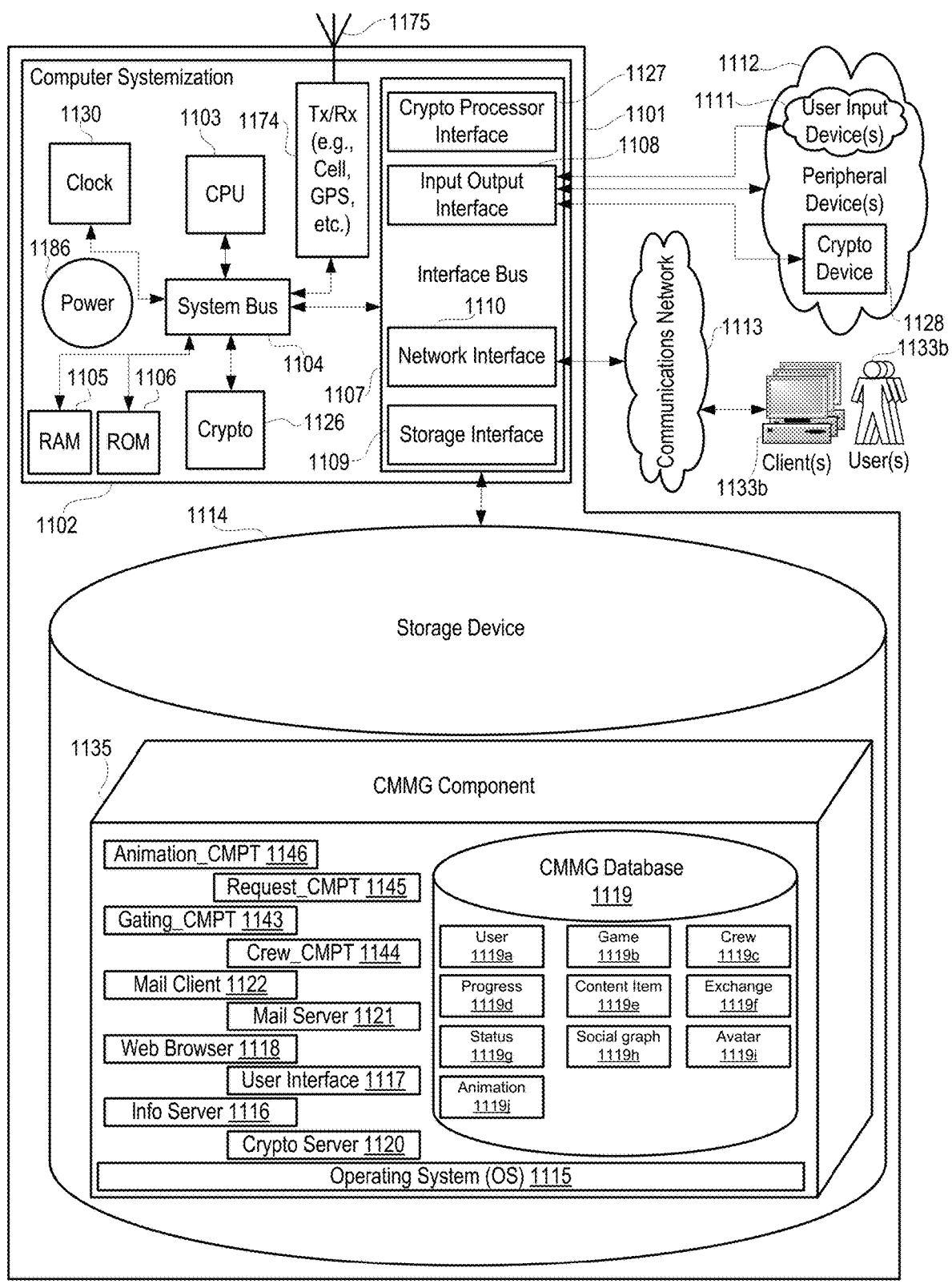
FIG. 11 shows a CMMG controller, in accordance with an embodiment of the invention.

FIG. 11 shows one embodiment of a Crew Mechanics in Multiplayer Games (hereinafter, "CMMG") controller. In this embodiment, the CMMG controller 1101 may serve to aggregate, process, store, search, serve, identify, instruct, generate, match, and/or facilitate interactions with a computer through software, listing service and financial management technologies, and/or other related data.

Users may engage information technology (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed include: input and output mechanisms through which data may pass into and out of a computer; memory storage into which data may be saved; and processors by which information may be processed. These information technology resources may be used to collect data for later retrieval, analysis, and manipulation, which may be facilitated through a database program.

In one embodiment, the CMMG controller 1101 may be connected to and/or communicate with: a processor 1103 or central processing unit ("CPU"); one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers and/or clients across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CMMG controller 1101 may be based on a computer systemization 1102 connected to the CMMG component 1135. The CMMG controller 1101 transforms in game status of a user's social content item via CMMG components into a content item with layered integration of additional content indicative of status. In one embodiment, the CMMG component may include a gating_component 1143 and a crew_component 1144. In one embodiment, the CMMG component may further include a request_component 1145 and an animation_component 1146. Depending on the implementation, one or more of the noted components may operate on a dedicated server, performed through an associated cloud service or by using a hybrid cloud technique. The hybrid cloud technique may include using platform-oriented and/or service-oriented cloud architectures in combination with a dedicated server.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory (e.g., a read only memory (ROM) 1106, a random access memory (RAM) 1104, etc.), and/or an interface bus 1107. These components may be interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186. The power source may be external or internal to the respective computer systemization. A cryptographic processor 1126 and/or transceivers (e.g., ICs) 1174 may be connected to the system bus. In another embodiment, the cryptographic processor and/or transceivers may be connected as either internal and/or external peripheral devices 1112 via the interface bus I/O. The transceivers may be connected to antenna(s) 1175, thereby effectuating wireless transmission and reception of various communication and/or sensor protocols. For example, the antenna(s) may connect to: a Texas Instruments WiLink WL1283 transceiver chip (e.g., providing 802.11n, Bluetooth 3.0, FM, global positioning system (GPS) (thereby allowing CMMG controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies XGold 618-PMB9800 (e.g., providing 2G/3G HSDPA/HSUPA communications); and/or the like. The system clock may include a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization may drive signals embodying information. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in some embodiments, any of the above components may be connected directly to one another, connected to the CPU, and/or organized in numerous variations.

The CPU may comprise data processor adequate to execute program components for executing user and/or CMMG-generated requests. A processor may include specialized processing units. For example, a processor may include integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to data processing techniques. Such instruction passing facilitates communication within the CMMG controller and beyond through various interfaces. Should processing requirements dictate a greater amount speed and/or capacity, distributed processors (e.g., Distributed CMMG), mainframe, multi-core, parallel, and/or super-computer architectures may similarly be employed. Alternatively, should deployment requirements dictate greater portability, smaller Personal Digital Assistants (PDAs) may be employed.

Features of the CMMG may be achieved by implementing a microcontroller such as CAST's R8051XC2 microcontroller; Intel's MCS 51 (i.e., 8051 microcontroller); and/or the like. Some feature implementations may include embedded components, such as: Application-Specific Integrated Circuit ("ASIC"), Digital Signal Processing ("DSP"), Field Programmable Gate Array ("FPGA"), and/or the like embedded technology. For example, any of the CMMG component collection (distributed or otherwise) and/or features may be implemented via the microprocessor and/or via embedded components; e.g., via ASIC, coprocessor, DSP, FPGA, and/or the like. Alternately, some implementations of the CMMG may be implemented with embedded components that are configured and used to achieve a variety of features or signal processing.

The embedded components may include software solutions, hardware solutions, and/or some combination of both hardware/software solutions. For example, CMMG features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer to implement the CMMG features. A hierarchy of programmable interconnects allow logic blocks to be interconnected as needed by the CMMG administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. The CMMG may be developed on FPGAs and/or migrated into a fixed version that more resembles ASIC implementations. Alternate or coordinating implementations may migrate CMMG controller features to a final ASIC instead of or in addition to FPGAs. Embedded components and microprocessors may be considered the "CPU" and/or "processor" for the CMMG.

Power Source

The power source 1186 may be of any form for powering electronic circuit board devices. Power cells may include alkaline, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 may be connected to at least one of the interconnected subsequent components of the CMMG platform thereby providing an electric current to all subsequent components. In one example, the power source 1186 is connected to the system bus component 1104. An outside power source 1186 may be connected across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters may connect to the interface bus via a slot architecture. Some slot architectures may include: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the CMMG controller is accessible through remote clients 1133*b* (e.g., computers with web browsers) by users 1133*a*. Network interfaces may employ connection protocols such as, but not limited to: direct connect, Ethernet (thick, thin, twisted pair 10/100/

1000 Base T, and/or the like), Token Ring, wireless connection such as IEEE 802.11a-x, and/or the like. Should processing requirements dictate a greater amount speed and/or capacity, distributed network controllers (e.g., Distributed CMMG), architectures may similarly be employed to pool, load balance, and/or otherwise increase the communicative bandwidth required by the CMMG controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 often are a type of peripheral device 1112 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the CMMG controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1128), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CMMG controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the CMMG controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the CMMG controller and/or a computer systemization may employ various forms of memory. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory will include ROM 1106, RAM 1105, and a storage device 1114. A storage device 1114 may be any conventional computer storage. Storage devices may include a (fixed and/or removable) magnetic disk drive; a magneto-optical drive; an optical drive (i.e., Bluray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) 1115 (operating system);

information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the CMMG component(s) 1135; and/or the like (i.e., collectively a component collection). These components may be stored and accessed from the storage devices and/or from storage devices accessible through an interface bus. Although nonconventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the CMMG controller. Typically, the operating system facilitates access of I/O, network interfaces, peripheral devices, storage devices, and/or the like. The operating system may be a highly fault tolerant, scalable, and secure such as: Apple Macintosh OS X (Server); AT&T Plan 9; Be OS; Unix and Unix like distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. Other operating systems may also be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CMMG controller to communicate with other entities through a communications network 1113. Various communication protocols may be used by the CMMG controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CMMG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CMMG database 1119, operating systems, other program components, user interfaces, Web browsers, and/or the like.

Access to the CMMG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CMMG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CMMG as a query. Upon generating query results from the query, the results are passed over the bridge mechanism, and may be parsed for formatting and generation of new results Web page by the bridge mechanism. Such a new results Web page is then provided to the information server, which may supply it to the requestingWeb browser.

Also, an information server may contain, communicate, generate, obtain, and/or provide program component, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, HTML5, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components through textual and/or graphical facilities. The user interface provides a facility through which users may affect, interact, and/or operate a computer. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, HTML5, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, user, and/or data communications, requests, and/or responses. Also, in place of a Web browser and information server, a combined application may be developed to perform similar operations of both. The combined application would similarly affect the obtaining and the provision of information to users, user agents, and/or the like from the CMMG enabled nodes.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CMMG.

Access to the CMMG mail may be achieved through a number of APIs offered by the individual Web server components and/or the operating system.

Also, a mail server may contain, communicate, generate, obtain, and/or provide program component, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, user, and/or data communications, requests, information, and/or responses. Generally, the mail client provides a facility to compose and transmit electronic mail messages.

Cryptographic Server

A cryptographic server component 1120 may include a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component is operable to facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CMMG may encrypt all incoming and/or outgoing communications and may serve as node within a virtual private network (VPN) with a wider communications network. The cryptographic component is operable to facilitate the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the CMMG component to engage in secure transactions if so desired. The cryptographic component facilitates the secure accessing of resources on the CMMG and facilitates the access of secured and/or remote resources For example, the cryptographic component may act as a client and/or server of secured resources. In one embodiment, the cryptographic component communicates with information servers, operating systems, other program components, and/or the like. The cryptographic component may contain, communicate, generate, obtain, and/or provide program component, user, and/or data communications, requests, and/or responses.

The CMMG Database

The CMMG database component 1119 may be embodied in a database and its stored data. The database may include a stored program component, which may be executed by the CPU; the stored program component portion configuring the CPU to process the stored data. The database may be a conventional, fault tolerant, relational, scalable, secure database such as Oracle or Sybase. Relational databases may include extensions of a flat file(s). Relational databases may comprise a series of related tables. In some embodiments, the tables may be interconnected or associated via a key field. Use of the key field allows the combination of the tables by indexing against the key field; i.e., the key fields act as dimensional pivot points for combining information from various tables. Relationships generally identify links maintained between tables by matching primary keys. Primary keys may represent fields that uniquely identify the rows of a table in a relational database. More precisely, they uniquely identify rows of a table on the "one" side of a one-to-many relationship.

In one embodiment, the CMMG database may be implemented using various standard data-structures, such as an array, hash, (linked) list, structured document or text file (e.g., XML), table, and/or the like. Such data-structures may be stored in memory and/or in (structured) files. In one embodiment, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases where objects may include encapsulated capabilities. If the CMMG database is implemented as a data-structure, the use of the CMMG database 1119 may be integrated into another component such as the CMMG component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119a-f. A user table 1119a includes fields such as, but not limited to: user_name, user_identifier, user_crew and/or the like. The user table may support and/or track multiple user accounts on the CMMG platform.

A game table 1119b includes fields such as, but not limited to: game_Identifier, game_type and/or the like. The game table may support and/or trac_ multiple game accounts on the CMMG platform.

A crew table 1119c includes fields such as, but not limited to: crew_identifier, crew_type, crew_sector, crew_goal and/or the like. The crew table may support and/or track multiple crew on the CMMG platform.

A progress table 1119d includes fields such as, but not limited to: progress_identifier, progress_associations, progress_index and/or the like. The progress table may support and/or track multiple progress bars on the CMMG platform.

A content_item 1119e includes fields such as, but not limited to: content_item_identifier, content_item_associations, content_item_type, content_item_price, content_item_progress, content_item_analytics and/or the like. The content_item table may support and/or track multiple content_item accounts on the CMMG platform.

An exchange 1119f includes fields such as, but not limited to: exchange_identifier, exchange_type, exchange_routing_number, exchange_bank, exchange_credits, exchange_transfer, exchange_deposit_account and/or the like. The exchange table may support and/or track multiple exchange accounts on the CMMG platform.

A status 1119g includes fields such as, but not limited to: status_identifier, status_type, status_user, status_crew, status_feed and/or the like. The status table may support and/or track multiple framework accounts on the CMMG platform.

A social graph 1119h includes fields such as, but not limited to: social_graph_identifier, social_graph_associations, social_graph_status, social_graph_analytics and/or the like. The social graph table may support and/or track multiple social graphs on the CMMG platform.

An avatar table 1119i includes fields such as, but not limited to: avatar_identifier, avatar_type, avatar_status, avatar_associations, avatar_modifications and/or the like. The avatar table may support and/or track multiple avatars on the CMMG platform.

An animation table 1119j includes fields such as, but not limited to: animation_identifier, animation_type, animation_associations and/or the like. The animation table may support and/or track multiple animations on the CMMG platform.

In one embodiment, the CMMG database may interact with other databases. For example, employing a distributed database, queries and data access by search CMMG component may treat the combination of the CMMG database, an integrated data security layer database as a single database entity.

In one embodiment, user programs may contain various user interface primitives, which may serve to update the CMMG. Also, various accounts may require custom database tables depending upon the environments and the types of clients the CMMG may need to serve. It should be noted that any unique fields may be designated as a key field throughout. In an alternative embodiment, these tables have been decentralized into their own databases and their respective database controllers (i.e., individual database controllers for each of the above tables). Employing advantageous data processing techniques, one may further distribute the databases over several storage devices. Similarly, configurations of the decentralized database controllers may be varied by consolidating and/or distributing the various database components 1119. The CMMG may be configured to keep track of various settings, inputs, and parameters via database controllers.

The CMMG database may communicate to and/or with other components in a component collection, including itself, and/or facilities of the like. Most frequently, the CMMG database communicates with the CMMG component, other program components, and/or the like. The database may contain, retain, and provide information regarding other nodes and data.

The CMMG Component

The CMMG component 1135 is a stored program component that is executed by a CPU. In one embodiment, the CMMG component incorporates any and/or all combinations of the aspects of the CMMG that was discussed in the previous figures. As such, the CMMG affects accessing, obtaining and the provision of information, services, transactions, and/or the like across various communications networks.

In one embodiment, the CMMG platform transforms in game status of a user's social content item, via CMMG components 1135 into a content item with layered integration of additional content indicative of status.

The CMMG component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; HTML5; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CMMG server employs a cryptographic server to encrypt and decrypt communications. The CMMG component may communicate to and/or with other components in a component collection, including itself, and/or facilities of the like. Most frequently, the CMMG component communicates with the CMMG database, operating systems, other program components, and/or the like. The CMMG may contain, communicate, generate, obtain, and/or provide program component, user, and/or data communications, requests, and/or responses.

Distributed CMMGs

The structure and/or operation of any of the CMMG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through advantageous data processing communication techniques.

The configuration of the CMMG controller may depend on the context of implementation. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.: w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of implementation.

For example, in some implementations, the CMMG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database.

In order to address various issues and advance the art, the entirety of this application shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CMMG individual and/or enterprise user, database configuration and/or relational model, data type, data transmission and/or network framework, syntax structure, and/or the like, various embodiments of the CMMG, may be implemented that enable a great deal of flexibility and customization. For example, aspects of the CMMG may be adapted for dedicating processor power to online scalable processes, e.g. SETI. While various embodiments and discussions of the CMMG have been directed social gaming mechanics, however, it is to be understood that the embodiments described herein may be readily configured and/or customized for a wide variety of other applications and/or implementations.

It will be appreciated that the above-described principles of the present invention are readily applicable in the context of various social networking websites, such as Facebook, Google+, and the like. Furthermore, they are also applicable in the context of social media websites, such as MySpace. As previously noted, the term "social network" or "social networking website" as used in this disclosure is to be broadly interpreted to include, for example, any website that allows its users to selectively access (e.g., according to a contact list, buddy list, social graph, etc.) each other's profiles and/or streams or selectively communicate (e.g., according to a contact list, buddy list, social graph, etc.) with each other.

Some portions of the disclosure describe algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like.

Furthermore, it is also convenient at times, to refer to certain arrangements of steps requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the context, descriptions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission, or display devices.

Certain aspects of the example embodiments include process steps and instructions described herein in the form of an algorithm. It should be noted that the process steps and instructions of the example embodiments could be embodied in software, firmware, or hardware, and when embodied in software, could be downloaded to reside on and be operated from different platforms used by a variety of operating systems. Some example embodiments also relate to an apparatus for performing the operations described in the disclosure. This apparatus might be specially constructed for the required purposes, or it may comprise a general-purpose computer selectively activated or reconfigured by a computer program stored in the computer. Such a computer program might be stored in a computer-readable storage medium, such as, but is not limited to, any type of disk including floppy disks, optical disks, CO-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

Furthermore, one or more of computers referred to in the disclosure might include a single processor or might be architectures employing multiple processor designs for increased computing capability. The algorithms and/or displays described in the disclosure are not inherently related to any particular computer or other apparatus. Various general-purpose systems may also be used with programs in accordance with the teachings described in the disclosure, or it might prove convenient to construct more specialized apparatuses to perform the described method steps.

In addition, the example embodiments in the disclosure are not described with reference to any particular programming language. It will be appreciated that a variety of programming languages might be used to implement the example embodiments.

Accordingly, the disclosure of the example embodiments is intended to be illustrative, but not limiting, of the scope of the inventions, which are set forth in the following claims and their equivalents. Although example embodiments of the inventions have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for performing a social project in a video game, comprising:
    using a video game server computer to initiate a session of the video game for a primary user, the session of the video game being configured to process communication received over a network from a first client device that is associated with the primary user;
    responsive to receiving a social project request over the network from the first client device, initiating a social project within the session of the video game;
    determining one or more secondary users from a social graph of the primary user;
    using the video game server computer to send a message over the network to one or more secondary client devices that are respectively associated with the one or more secondary users, the message requesting help from the one or more secondary users to complete the social project, the message including a low-friction response mechanism;
    receiving over the network, upon activation of the low-friction response mechanism of the message, a response from one of the secondary client devices associated with a responsive secondary user indicating an intent to help perform a task to help complete the social project; and
    wherein upon receiving the response, the response itself is configured to trigger automated animation of an avatar of the responsive secondary user within the primary user's session of the video game, the animation showing the avatar actively participating in performing the task to help complete at least one aspect of the social project, and wherein the automated animation of the avatar does not require the responsive secondary user to control the avatar.

2. The method of claim 1, wherein the message is sent via an external communication mechanism that is independent of the video game, and wherein the low-friction response mechanism is activated from the message as received by the responsive secondary user via the external communication mechanism.

3. The method of claim 1,
    wherein determining one or more secondary users includes searching the social graph of the primary user for users having accounts for the video game, presenting a portion of the users having accounts in the primary user's session, and receiving a selection of users from among the presented portion.

4. The method of claim 1,
    wherein a speed of performance of the social project increases in response to receiving the response from the responsive secondary user.

5. The method of claim 1, further comprising,
    upon receiving the response, the response itself is configured to trigger crediting an account of the responsive secondary user.

6. The method of claim 1,
    wherein the avatar of the responsive secondary user includes a profile picture of the responsive secondary user.

7. A computer program product comprising program instructions embodied on a non-transitory computer readable medium, the program instructions for performing a social project in a video game, the program instructions including:
    program instructions for using a video game server computer to initiate a session of the video game for a primary user, the session of the video game being configured to process communication received over a network from a first client device that is associated with the primary user;
    program instructions for, responsive to receiving a social project request over the network from the first client device, initiating a social project within the session of the video game;
    program instructions for determining one or more secondary users from a social graph of the primary user;
    program instructions for using the video game server computer to send a message over the network to one or more secondary client devices that are respectively associated with the one or more secondary users, the message requesting help from the one or more secondary users to complete the social project, the message including a low-friction response mechanism;
    program instructions for receiving over the network, upon activation of the low-friction response mechanism of the message, a response from one of the secondary client devices associated with a responsive secondary user indicating an intent to help perform a task to help complete the social project; and
    program instructions for, wherein upon receiving the response, the response itself is configured to trigger automated animation of an avatar of the responsive secondary user within the primary user's session of the video game, the animation showing the avatar actively participating in performing the task to help complete at least one aspect of the social project, and wherein the automated retrieval and animation of the avatar does not require the responsive secondary user to control the avatar.

8. The computer program product of claim 7, wherein the message is sent via an external communication mechanism that is independent of the video game, and wherein the low-friction response mechanism is activated from the message as received by the responsive secondary user via the external communication mechanism.

9. The computer program product of claim 7,
wherein determining one or more secondary users includes searching the social graph of the primary user for users having accounts for the video game, presenting a portion of the users having accounts in the primary user's session, and receiving a selection of users from among the presented portion.

10. The computer program product of claim 7,
wherein a speed of performance of the social project increases in response to receiving the response from the responsive secondary user.

11. The computer program product of claim 7, further comprising,
program instructions for, upon receiving the response, the response itself is configured to trigger crediting an account of the responsive secondary user.

12. The computer program product of claim 7,
wherein the avatar of the responsive secondary user includes a profile picture of the responsive secondary user.

13. A video game server computer for performing a social project in a video game, comprising:
a session manager for initiating a session of the video game for a primary user, the session of the video game being configured to process communication received over a network from a first client device that is associated with the primary user, the session including a social project;
a request generator for determining one or more secondary users from a social graph of the primary user, the request generator further configured for sending a message over the network to one or more secondary client devices that are respectively associated with the one or more secondary users, the message requesting help from the one or more secondary users to complete the social project, the message including a low-friction response mechanism, activation of the low-friction response mechanism sending a response over the network from one of the secondary client devices associated with a responsive secondary user indicating an intent to help perform a task to help complete the social project;
a collaboration module configured to, wherein upon receiving the response, the response itself is configured to trigger automated animation of an avatar of the responsive secondary user within the primary user's session of the video game, the animation showing the avatar actively participating in performing the task to help complete at least one aspect of the social project, and wherein the automated animation of the avatar does not require the responsive secondary user to control the avatar.

14. The video game server of claim 13, wherein the message is sent via an external communication mechanism that is independent of the video game, and wherein the low-friction response mechanism is activated from the message as received by the responsive secondary user via the external communication mechanism.

15. The video game server of claim 13,
wherein the request generator determines the one or more secondary users by searching the social graph of the primary user for users having accounts for the video game, presenting a portion of the users having accounts in the primary user's session, and receiving a selection of users from among the presented portion.

16. The video game server of claim 13,
wherein a speed of performance of the social project increases in response to receiving the response from the responsive secondary user.

17. The video game server of claim 13,
wherein the collaboration module is configured to, upon receiving the response, the response itself is configured to trigger crediting an account of the responsive secondary user.

18. The video game server of claim 13,
wherein the collaboration module is configured to retrieve a profile picture of the responsive secondary user.

* * * * *